(12) United States Patent
Ribour

(10) Patent No.: US 11,634,565 B2
(45) Date of Patent: Apr. 25, 2023

(54) CAPS OR CLOSURES MADE FROM A RESIN COMPOSITION COMPRISING POLYETHYLENE

(71) Applicant: TOTAL RESEARCH & TECHNOLOGY FELUY, Seneffe (BE)

(72) Inventor: David Ribour, Mairieux (FR)

(73) Assignee: TOTAL RESEARCH & TECHNOLOGY FELUY, Seneffe (BE)

(*) Notice: Subject to any disclaimer, the term of this patent is extended or adjusted under 35 U.S.C. 154(b) by 0 days.

(21) Appl. No.: 16/327,904

(22) PCT Filed: Aug. 25, 2017

(86) PCT No.: PCT/EP2017/071465
§ 371 (c)(1),
(2) Date: Feb. 25, 2019

(87) PCT Pub. No.: WO2018/037122
PCT Pub. Date: Mar. 1, 2018

(65) Prior Publication Data
US 2019/0218379 A1 Jul. 18, 2019

(30) Foreign Application Priority Data
Aug. 26, 2016 (EP) .................................. 16185793

(51) Int. Cl.
| C08L 23/06 | (2006.01) |
| C08K 5/20 | (2006.01) |
| C08K 5/3475 | (2006.01) |
| B29D 99/00 | (2010.01) |
| B65D 41/04 | (2006.01) |

(52) U.S. Cl.
CPC .......... *C08L 23/06* (2013.01); *B29D 99/0096* (2013.01); *C08K 5/20* (2013.01); *C08K 5/3475* (2013.01); *B65D 41/04* (2013.01); *C08L 2207/062* (2013.01); *C08L 2314/06* (2013.01)

(58) Field of Classification Search
CPC ....... C08L 23/06; B29D 99/0096; C08K 5/20; C08K 5/3475
See application file for complete search history.

(56) References Cited

U.S. PATENT DOCUMENTS

| 5,004,770 A | 4/1991 | Cortolano et al. |
| 5,096,950 A | 3/1992 | Galbo et al. |
| 5,112,890 A | 5/1992 | Malherbe et al. |
| 5,124,378 A | 6/1992 | Behrens |
| 5,145,893 A | 9/1992 | Galbo et al. |
| 5,204,473 A | 4/1993 | Winter et al. |
| 5,216,156 A | 6/1993 | Galbo et al. |
| 5,300,544 A | 4/1994 | Galbo et al. |
| 5,844,026 A | 12/1998 | Galbo et al. |
| 5,980,783 A | 11/1999 | Gugumus |
| 6,046,304 A | 4/2000 | Borzatta et al. |
| 6,117,995 A | 9/2000 | Zedda et al. |
| 6,271,377 B1 | 8/2001 | Galbo et al. |
| 6,297,299 B1 | 10/2001 | Borzatta et al. |
| 6,376,584 B1 | 4/2002 | Galbo et al. |
| 6,392,041 B1 | 5/2002 | Galbo et al. |
| 6,472,456 B1 | 10/2002 | Horsey et al. |
| 6,864,207 B2 | 3/2005 | Knoeppel et al. |
| 6,930,071 B2 | 8/2005 | Knoeppel et al. |
| 2003/0105198 A1† | 6/2003 | Plume |
| 2012/0130027 A1* | 5/2012 | Standaert ............... C08F 210/16 526/64 |
| 2013/0072632 A1† | 6/2013 | Wang |
| 2014/0371397 A1* | 12/2014 | Ribour ................... C08L 23/06 525/240 |

FOREIGN PATENT DOCUMENTS

| WO | 2013045663 A1 | 4/2013 |
| WO | 2016165773 A1 | 10/2016 |

OTHER PUBLICATIONS

Plastics Additives Handbook, ed. H. Zweifel, 5th edition, 2001, Hanser Publishers.
Hoover et al, "An experimental study on the effects of UV absorbers stabilization of slip agents in water bottle closures", Society of Plastics Engineers. Annual Technical Conferences, the Society, Brookfield Center, CT, US, (Jan. 1, 2003), vol. 3, pp. 2702-2706, 2003.
International Search Report issued in Application No. PCT/EP2017/071465, dated Nov. 2, 2017, 4 pages.
Injection Moulding Handbook, D.V. Rosato et al., 3rd edition, 2000, Kluwer Academic Publishers.

\* cited by examiner
† cited by third party

*Primary Examiner* — John E Uselding
(74) *Attorney, Agent, or Firm* — Amster, Rothstein & Ebenstein LLP

(57) ABSTRACT

Described herein are caps or closures made from a resin composition having at least one polyethylene having a density of at least 0.940 g/cm$^3$ when measured following the ISO 1183-2 method at 23° C.; erucamide; and at least 700 ppm based on the total weight of the resin composition of at least one ultraviolet absorber selected from the hydroxyphenylbenzotriazole class. A process for the production of such caps or closures is also described herein.

9 Claims, No Drawings

CAPS OR CLOSURES MADE FROM A RESIN COMPOSITION COMPRISING POLYETHYLENE

CROSS-REFERENCE TO RELATED APPLICATIONS

This application claims the benefit of PCT/EP2017/071465 filed Aug. 25, 2017, which claims priority from EP 16185793.3 filed Aug. 26, 2016, which are incorporated herein by reference in their entireties for all purposes.

FIELD OF THE INVENTION

The present invention relates to caps and closures made from a resin composition comprising at least one polyethylene, to the process for producing such caps and closures as well as to their use.

BACKGROUND OF THE INVENTION

Polyethylene has become one of the materials of choice in the caps and closures market. This is because polyethylene offers a good balance of mechanical properties and can easily be processed either by injection moulding or by compression moulding. Recent efforts to reduce the weight of the polyethylene caps and closures have led the industry to try developing high density polyethylene resins for caps and closures having high stress cracking resistance. These resins have a reasonable high stress crack resistance, but they leave room for improvement. Particularly, the organoleptic properties require much improvement.

Fatty acid amides are commonly added to the existing caps and closures high density polyethylene grades to improve the slip properties (easier removal torque). Mainly Erucamide and Behenamide are used for the beverages market.

Caps and closures based on Erucamide provide excellent slipping properties but very low organoleptic properties when exposed to sun/UV light or long time storage outside. Indeed Erucamide, being an unsaturated molecule, it is prone to degradation and volatiles can be generated (aldehydes, ketones . . . ) that can affect the product quality inside the bottle (taste and odor).

Caps and closures based on Behenamide provide excellent organoleptic properties but poor slipping performances (lower efficiency than Erucamide and longer migration time) making the cap difficult to remove for the consumers. Being a saturated molecule, it is however more stable to UV and sun light exposure.

There is therefore a demand for the caps and closures made of high density polyethylene compositions delivering both excellent slip and organoleptic properties while maintaining the other cap properties such as stiffness, and environmental stress crack resistance. The demand for such caps and closures is driven by the market that needs lighter cap designs (also called short neck cap) to reduce the cost, but with much better opening torques and organoleptic properties than caps made from the existing high density polyethylene compositions.

It is therefore an object of the present invention to provide caps and closures having improved slip properties. It is an additional object of the present invention to provide a cap or a closure having acceptable organoleptic properties. It is an additional object of the present invention to provide a cap or a closure having acceptable organoleptic and improved slip properties without deterioration of the other cap or closure properties such as stiffness and environmental stress crack resistance.

SUMMARY OF THE INVENTION

It has now surprisingly been found that the above objectives can be attained either individually or in any combination by a cap or closure comprising the specific and well-defined resin composition as disclosed herein.

Thus, the present invention provides a cap or closure made from a resin composition comprising
  at least one polyethylene having a density of at least 0.940 g/cm$^3$ when measured following the ISO 1183-2 method at 23° C.;
  erucamide; and
  at least 700 ppm based on the total weight of the resin composition of at least one ultraviolet absorber selected from the hydroxyphenylbenzotriazole class.

Preferably, the invention provides a cap or closure made from a resin composition comprising
  at least one polyethylene having a density of at least 0.940 g/cm$^3$ when measured following the ISO 1183-2 method at 23° C.;
  at least 400 ppm based on the total weight of the resin composition of erucamide; and
  at least 700 ppm based on the total weight of the resin composition of at least one ultraviolet absorber selected from the hydroxyphenylbenzotriazole class.

In addition, the present invention provides a process for the production of a cap or closure, said process comprising the steps of:
(a) blending at least one polyethylene having a density of at least 0.940 g/cm$^3$ when measured following the ISO 1183-2 method at 23° C.; with erucamide; and with at least 700 ppm based on the total weight of the blend of at least one ultraviolet absorber selected from the hydroxyphenylbenzotriazole class,
(b) extruding the blend,
(c) injection moulding or compression moulding the extruded blend into a cap or closure.

Preferably, the present invention provides a process for the production of a cap or closure, said process comprising the steps of:
  (a) blending at least one polyethylene having a density of at least 0.940 g/cm$^3$ when measured following the ISO 1183-2 method at 23° C.; with at least 400 ppm based on the total weight of the blend of erucamide; and with at least 700 ppm based on the total weight of the blend of at least one ultraviolet absorber selected from the hydroxyphenylbenzotriazole class,
  (b) extruding the blend,
  (c) injection moulding or compression moulding the extruded blend into a cap or closure.

The present invention provides caps and closures made of polyethylene resin having improved application/removal torques, and acceptable organoleptic properties.

The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

When describing the invention, the terms used are to be construed in accordance with the following definitions, unless a context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

Preferred statements (features) and embodiments of the articles, resins and uses of this invention are set herein below. Each statements and embodiments of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 25, with any other statement and/or embodiments.

1. Cap or closure made from a resin composition comprising:
    at least one polyethylene having a density of at least 0.940 g/cm$^3$ when measured following the ISO 1183-2 method at 23° C.;
    erucamide (cis-13-docosenoamide, CAS number 112-84-5); and
    at least 700 ppm based on the total weight of the resin composition of at least one ultraviolet absorber selected from the hydroxyphenylbenzotriazole class.
2. Cap or closure made from a resin composition comprising:
    at least one polyethylene having a density of at least 0.940 g/cm$^3$ when measured following the ISO 1183-2 method at 23° C.;
    at least 400 ppm based on the total weight of the resin composition of erucamide; and
    at least 700 ppm based on the total weight of the resin composition of at least one ultraviolet absorber selected from the hydroxyphenylbenzotriazole class.
3. Cap or closure according to any one of statements 1 or 2, wherein the resin composition further comprises behenamide (docosanamide, CAS number 3061-75-4).
4. Cap or closure according to any one of statement 1 to 3, wherein the resin composition comprises at least 800 ppm, preferably at least 900 ppm, preferably at least 1000 ppm based on the total weight of the resin composition of at least one ultraviolet absorber selected from the hydroxyphenylbenzotriazole class.
5. Cap or closure according to any one of statements 1 to 4, wherein the ultraviolet absorber is selected from the hydroxyphenylbenzotriazole class consisting of 2-(3-t-butyl-2-hydroxy-5-methylphenyl)-5-chlorobenzotriazole, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octyl phenyl)benzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy)carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl]benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methylphenyl]benzotriazole, 2-(3,5-di-t-butyl-2-hydroxyphenyl)-5-chlorobenzotriazole; a mixture of 2-(3'-dodecyl-2'-hydroxy-5'-methylphenyl)benzotriazole and 2-[3'-t-butyl-2'-hydroxy-5'-(2-isooctyloxycarbonylethyl)phenyl]benzotriazole; 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol]; a condensate of poly(3 to 11)(ethylene glycol) with 2-[3'-t-butyl-2'-hydroxy-5'-(2-methoxycarbonylethyl)phenyl]benzotriazole, a condensate of poly(3 to 11)(ethylene glycol) with methyl 3-[3-(2H-benzotriazol-2-yl)-5-t-butyl-4-hydroxyphenyl]propionate; 2-ethylhexyl-3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxphenyl]propionate, methyl 3-[3-t-butyl-5-(5- chloro-2H-benzotriazol-2-yl)-4-hydroxyphenyl] propionate, 3-[3-t-butyl-5-(5-chloro-2H-benzotriazol-2-yl)-4-hydroxyphenyl]propionic acid and mixtures thereof.

6. Cap or closure according to any one of statements 1 to 5, wherein the ultraviolet absorber is 2-(3-t-butyl-2-hydroxy-5-methylphenyl)-5-chlorobenzotriazole (CAS No. 3896-11-05).

7. Cap or closure according to any one of statements 1 to 6, wherein the polyethylene has a melt index $MI_2$ of from 0.5 g/10 min to 50 g/10 min when measured following the ISO 1133 method at 190° C. under a load of 2.16 kg, preferably from 1.0 g/10 min to 10.0 g/10 min, more preferably from 1.0 g/10 min to 8.0 g/10 min, most preferably from 1.0 g/10 min to 4.0 g/10 min.

8. Cap or closure according to any one of statements 1 to 7, wherein the polyethylene has a density of at least 0.945 g/cm$^3$, more preferably of at least 0.950 g/cm$^3$, preferably at most 0.975 g/cm$^3$, preferably of at most 0.972 g/cm$^3$, preferably of at most 0.970 g/cm$^3$, preferably of at most 0.965 g/cm$^3$, preferably of at most 0.960 g/cm$^3$, preferably of at least 0.940 g/cm$^3$ and of at most 0.975 g/cm$^3$.

9. Cap or closure according to any one of statements 1 to 8, wherein the polyethylene has a density of at least 0.945 g/cm$^3$ and of at most 0.965 g/cm$^3$, preferably of from 0.950 g/cm$^3$ to 0.960 g/cm$^3$.

10. Cap or closure according to any one of statements 1 to 9, wherein the polyethylene has a molecular weight distribution (MWD), which is the ratio of the weight average molecular weight Mw to the number average molecular weight Mn, of at least 3.5, preferably at least 4.0, preferably at least 4.5.

11. Cap or closure according to any one of statements 1 to 10, wherein the polyethylene has a molecular weight distribution (MWD) of at most 15.0, preferably at most 10.0, preferably at most 8.0, preferably at most 6.0, preferably at most 5.5; preferably, the polyethylene has a MWD of from 3.5 to 15.0, preferably 3.5 to 10.0, preferably 3.5 to 8.0, preferably of from 4.0 to 6.0.

12. Cap or closure according to any one of statements 1 to 11, wherein the resin composition comprises at least 80% by weight of polyethylene, preferably at least 85% by weight, preferably at least 90% by weight, preferably at least 95% by weight of polyethylene based on the total weight of said resin composition.

13. Cap or closure according to any one of statements 1 to 12, wherein the polyethylene is formed using at least one metallocene catalyst.

14. Cap or closure according to any one of statements 1 to 13, wherein the polyethylene is a polyethylene having a bimodal molecular weight distribution.

15. Cap or closure according to any one of statements 1 to 14, wherein the polyethylene is produced in two or more serially connected reactors, comprising at least one first and at least one second reactors, preferably in loop reactors, more preferably in slurry loop reactors; more preferably, the polyethylene is produced in at least two serially connected slurry loop reactors.

16. Cap or closure according to any one of statements 1 to 15, wherein the resin composition comprises at least 400 ppm of erucamide, preferably at least 500 ppm, preferably at least 600 ppm, preferably at least 700 ppm, preferably a least 800 ppm, preferably at least 900 ppm, preferably at least 1000 ppm based on the total weight of the resin composition.

17. Cap or closure according to any one of statements 1 to 16, wherein the resin composition comprises at least 400 ppm of behenamide, preferably at least 500 ppm, preferably at least 600 ppm, preferably at least 700 ppm, preferably a least 800 ppm, preferably at least 900 ppm, preferably at least 1000 ppm based on the total weight of the resin composition.

18. A cap or closure according to any one of statements 1 to 17, which is a screw cap.

19. Process for the production of a cap or closure according to any one of statements 1 to 18, said process comprising the steps of:
    (a) blending at least one polyethylene having a density of at least 0.940 g/cm$^3$ when measured following the ISO 1183-2 method at 23° C.; with erucamide (cis-13-docosenoamide, CAS number 112-84-5); and with at least 700 ppm based on the total weight of the blend of at least one ultraviolet absorber selected from the hydroxyphenylbenzotriazole class,
    (b) extruding the blend,
    (c) injection moulding or compression moulding the extruded blend into a cap or closure.

20. Process for the production of a cap or closure according to any one of statements 1 to 18, said process comprising the steps of:
    (a) blending at least one polyethylene having a density of at least 0.940 g/cm$^3$ when measured following the ISO 1183-2 method at 23° C.; with at least 400 ppm based on the total weight of the blend of erucamide; and with at least 700 ppm based on the total weight of the blend of at least one ultraviolet absorber selected from the hydroxyphenylbenzotriazole class,
    (b) extruding the blend,
    (c) injection moulding or compression moulding the extruded blend into a cap or closure.

21. Process according to any one of statements 19 or 20, wherein behenamide (docosamide, CAS number 3061-75-4) is also present in the blending step.

22. Use of the cap or closure according to any one of statements 1 to 18, or produced by a process according to statements 19 to 21 in the food or drink industry.

23. Use of the cap or closure according to statement 22 for carbonated and still drinks.

24. Use of a resin composition for the manufacture of a cap or closure as defined in any one of statements 1 to 18 by injection moulding or compression moulding, wherein the resin composition comprises:
    at least one polyethylene having a density of at least 0.940 g/cm$^3$ when measured following the ISO 1183-2 method at 23° C.;
    erucamide (cis-13-docosenoamide, CAS number 112-84-5); and
    at least 700 ppm based on the total weight of the resin composition of at least one ultraviolet absorber selected from the hydroxyphenylbenzotriazole class.

25. Use of a resin composition for the manufacture of a cap or closure as defined in any one of statements 1 to 18 by injection moulding or compression moulding, wherein the resin composition comprises:
    at least one polyethylene having a density of at least 0.940 g/cm$^3$ when measured following the ISO 1183-2 method at 23° C.;
    at least 400 ppm based on the total weight of the resin composition of erucamide (cis-13-docosenoamide, CAS number 112-84-5); and
    at least 700 ppm based on the total weight of the resin composition of at least one ultraviolet absorber selected from the hydroxyphenylbenzotriazole class.

The present invention relates to a cap or closure made of a resin composition comprising: at least one polyethylene polymer having a density of at least 0.940 g/cm³ when measured following the ISO 1183-2 method at 23° C.; erucamide; and at least 700 ppm based on the total weight of the resin composition of at least one ultraviolet absorber selected from the hydroxyphenylbenzotriazole class. Preferably the resin composition comprises at least 400 ppm based on the total weight of the resin composition of erucamide.

For the purposes of the present application, the term "polyethylene" or "polyethylene polymer" is synonymous and is used to denote ethylene homopolymer as well as ethylene copolymers. If the polyethylene is a copolymer, the comonomer can be any alpha-olefin i.e. any 1-alkylene comprising from 2 to 12 carbon atoms, for example, ethylene, propylene, 1-butene, and 1-hexene. The copolymer can be an alternating, periodic, random, and statistical or block copolymer. Preferably, the polyethylene used in the invention is a homopolymer or a copolymer of ethylene and hexene or butene.

The polyethylene for use in the present invention has preferably a density of at least 0.940 g/cm³, preferably of at least 0.945 g/cm³, preferably of at least 0.950 g/cm³, preferably of at least 0.951 g/cm³. In some embodiments, the polyethylene for use in the present invention has preferably a density of at most 0.975 g/cm³, preferably at most 0.970 g/cm³, preferably of at most 0.965 g/cm³, more preferably of at most 0.960 g/cm³, as measured following the method of standard test ISO 1183-2 at a temperature of 23° C. In an embodiment the polyethylene has a density of at least 0.940 g/cm³ to at most 0.975 g/cm³, preferably of at least 0.945 g/cm³ to at most 0.965 g/cm³.

Preferably, the polyethylene for use in the invention has a melt index (MI2), measured at 190° C. under a 2.16 kg load according to ISO 1133 of from 0.5 g/10 min to 50 g/10 min, preferably from 1 g/10 min to 10 g/10 min, more preferably from 1.0 g/10 min to 8 g/10 min, most preferably from 1.0 g/10 min to 4 g/10 min.

Preferably, the polyethylene for use in the invention has a molecular weight distribution (MWD), which is the ratio of the weight average molecular weight Mw to the number average molecular weight Mn, of at least 3.5, more preferably at least 4.0 and a MWD of at most 15.0, preferably at most 6.0, more preferably at most 5.5. In an embodiment, the polyethylene has a MWD of from 3.5 to 15.0, preferably of from 4.0 to 6.0.

The polyethylene can be produced using any catalyst known in the art, such as chromium catalysts, Ziegler-Natta catalysts and metallocene catalysts.

The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. Nos. 6,930,071 and 6,864,207, which are incorporated herein by reference. A preferred Ziegler-Natta catalyst system comprises a titanium compound having at least one titanium-halogen bond and an internal electron donor, both on a suitable support (for example on a magnesium halide in active form), an organo-aluminium compound (such as an aluminium trialkyl), and an optional external donor.

The term "chromium catalysts" refers to catalysts obtained by deposition of chromium oxide on a support, e.g. a silica or aluminium support. Illustrative examples of chromium catalysts comprise but are not limited to $CrSiO_2$ or $CrAl_2O_3$.

Preferably, the polyethylene is formed using at least one metallocene catalyst.

The term "metallocene catalyst" is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In one embodiment of the present invention, the metallocene catalyst is a compound of formula (I) or (II)

$$(Ar)_2MQ_2 \text{ (I); or } R''(Ar)_2MQ_2 \tag{II},$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, $SIR_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;

wherein M is a transition metal selected from the group consisting of titanium, zirconium, hafnium, and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl, and P; and wherein R" is a divalent group or moiety bridging the two Ar groups and selected from the group consisting of $C_1$-$C_{20}$ alkylene, germanium, silicon, siloxane, alkylphosphine, and an amine, and wherein said R" is optionally substituted with one or more substituents each independently selected from the group consisting of halogen, hydrosilyl, $SiR_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl, and P.

Preferably, the metallocene comprises a bridged bis-indenyl and/or a bridged bis-tetrahydrogenated indenyl component. In some embodiments, the metallocene can be selected from one of the following formula (IIIa) or (IIIb):

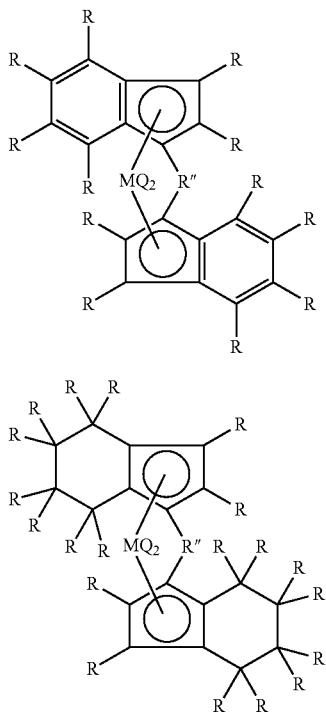

wherein each R in formula (IIIa) or (IIIb) is the same or different and is selected independently from hydrogen or $XR'_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents $XR'_v$ on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$ alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3,4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by a aryl as defined herein. When a subscript is used herein following a carbon atom, the subscript refers to the number of carbon atoms that the named group may contain.

Examples of $C_{6-10}$ aryl$C_{1-6}$ alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—CH$_2$—), ethylene (—CH$_2$—CH$_2$—), methylmethylene (—CH(CH$_3$)—), 1-methyl-ethylene (—CH(CH$_3$)—CH$_2$—), n-propylene (—CH$_2$—CH$_2$—CH$_2$—), 2-methylpropylene (—CH$_2$—CH(CH$_3$)—CH$_2$—), 3-methylpropylene (—CH$_2$—CH$_2$—CH(CH$_3$)—), n-butylene (—CH$_2$—CH$_2$—CH$_2$—CH$_2$—), 2-methylbutylene (—CH$_2$—CH(CH$_3$)—CH$_2$—CH$_2$—), 4-methylbutylene (—CH$_2$—CH$_2$—CH$_2$—CH(CH$_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed or other form.

In some embodiments, the support of the metallocene catalyst is a porous support, and preferably a porous silica support.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In some embodiments, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In some embodiments, alumoxanes comprise oligomeric linear and/or cyclic alkyl alumoxanes. In a further embodiment, the alumoxane has formula (IV) or (V)

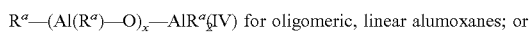 for oligomeric, linear alumoxanes; or

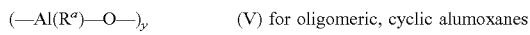 (V) for oligomeric, cyclic alumoxanes wherein x is 1-40, and preferably 10-20;
wherein y is 3-40, and preferably 3-20; and
wherein each $R^a$ is independently selected from a $C_1$-$C_8$ alkyl, and preferably is methyl. In a preferred embodiment, the alumoxane is methylalumoxane (MAO).

In a preferred embodiment, the metallocene catalyst used is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula AlR$^b_x$ can be used as additional cocatalyst, wherein each R$^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

The polyethylene may be monomodal or multimodal. Preferably the polyethylene used is multimodal, more preferably bimodal.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin can have an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weights, as defined above, for example when the two distinct populations were prepared in different reactors and/or under different conditions.

The polyethylene may be produced by gas, slurry or solution phase process in one or several reactors connected to each other in series. Preferably the polyethylene is produced in two or more serially connected reactors. Slurry polymerization is preferably used, preferably in a slurry loop reactor or a continuously stirred reactor.

Preferably, the polyethylene is produced in two or more serially connected reactors, comprising at least one first and at least one second reactors, preferably loop reactors, more preferably slurry loop reactors. The polyethylene is produced in at least two serially connected slurry loop reactors, preferably in a double loop reactor.

The polymerization temperature can range from 20° C. to 125° C., preferably from 55° C. to 105° C., more preferably from 60° C. to 100° C. and most preferably from 65° C. to 98° C. Preferably, the temperature range may be within the range from 75° C. to 100° C. and most preferably from 78° C. to 98° C. The polymerization pressure can range from 20 bar to 100 bar, preferably from 30 bar to 50 bar, and more preferably from 37 bar to 45 bar.

According to the invention, the resin composition comprises erucamide (cis-13-docosenoamide, CAS number 112-84-5). In an embodiment, the resin composition comprises at least 400 ppm of erucamide based on the total weight of the resin composition, preferably at least 500 ppm, preferably at least 600 ppm, preferably at least 700 ppm, preferably a least 800 ppm, preferably at least 900 ppm, preferably at least 1000 ppm of erucamide based on the total weight of the resin composition, and preferably at least 1050 ppm by weight. Preferably the resin composition comprises at most 4000 ppm of erucamide based on the total weight of the resin composition, preferably at most 3000 ppm of erucamide, preferably at most 2500 ppm of erucamide based on the total weight of the resin composition.

According to a preferred embodiment, the resin composition can further comprise behenamide (docosanamide, CAS number 3061-75-4).

Preferably, the cap or closure is made from a resin composition comprising:
at least one polyethylene having a density of at least 0.940 g/cm$^3$ when measured following the ISO 1183-2 method at 23° C.;
erucamide;
behenamide; and
at least 700 ppm based on the total weight of the resin composition of at least one ultraviolet absorber selected from the hydroxyphenylbenzotriazole class.

In an embodiment, the resin composition comprises at least 400 ppm of behenamide based on the total weight of the resin composition, preferably at least 500 ppm, preferably at least 600 ppm, preferably at least 700 ppm, preferably a least 800 ppm, preferably at least 900 ppm, preferably at least 1000 ppm of behenamide based on the total weight of the resin composition, and preferably at least 1050 ppm by weight. Preferably the resin composition comprises at most 4000 ppm of behenamide based on the total weight of the resin composition, preferably at most 3000 ppm of behenamide, preferably at most 2500 ppm of behenamide based on the total weight of the resin composition.

Preferably, the cap or closure is made from a resin composition comprising:
at least one polyethylene having a density of at least 0.940 g/cm$^3$ when measured following the ISO 1183-2 method at 23° C.;
at least 500 ppm of erucamide based on the total weight of the resin composition;
at least 700 ppm based on the total weight of the resin composition of at least one ultraviolet absorber selected from the hydroxyphenylbenzotriazole class; and
optionally at least 500 ppm of behenamide based on the total weight of the resin composition.

According to the invention, the resin composition comprises at least 700 ppm based on the total weight of the resin composition of at least one ultraviolet absorber selected from the hydroxyphenylbenzotriazole class. Preferably, the resin composition comprises at least 800 ppm, preferably at least 900 ppm, preferably at least 1000 ppm based on the total weight of the resin composition of at least one ultraviolet absorber selected from the hydroxyphenylbenzotriazole class.

In an embodiment, the ultraviolet absorber is selected from the hydroxyphenylbenzotriazole class consisting of 2-(3-t-butyl-2-hydroxy-5-methylphenyl)-5-chlorobenzotriazole, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy)carbonylethyl]-2'-hydroxphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methylphenyl]benzotriazole, 2-(3,5-di-t-butyl-2-hydroxyphenyl)-5-chlorobenzotriazole; a mixture of 2-(3'-dodecyl-2'-hydroxy-5'-methylphenyl)benzotriazole and 2-[3'-t-butyl-2'-hydroxy-5'-(2-isooctyloxycarbonylethyl)phenyl]benzotriazole; 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol]; a condensate of poly(3 to 11)(ethylene glycol) with 2-[3'-t-butyl-2'-hydroxy-5'-(2-methoxycarbonylethyl)phenyl]benzotriazole, a condensate of poly(3 to 11)(ethylene glycol) with methyl 3-[3-(2H-benzotriazol-2-yl)-5-t-butyl-4-hydroxyphenyl]propionate; 2-ethylhexyl-3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl] propionic acid and mixtures thereof.

Preferably, the ultraviolet absorber is 2-(3-t-butyl-2-hydroxy-5-methylphenyl)-5-chlorobenzotriazole (CAS No. 3896-11-05).

Preferably, the cap or closure is made from a resin composition comprising:
at least one polyethylene having a density of at least 0.940 g/cm$^3$ when measured following the ISO 1183-2 method at 23° C.;
erucamide;
at least 700 ppm based on the total weight of the resin composition of 2-(3-t-butyl-2-hydroxy-5-methylphenyl)-5-chlorobenzotriazole;
and optionally behenamide.

The resin composition may further contain additives, in particular additives suitable for injection and compression moulding, such as, by way of example, processing aids, mould-release agents, primary and secondary antioxidants, acid scavengers, flame retardants, fillers, nanocomposites, lubricants, antistatic additives, nucleating/clarifying agents, antibacterial agents, plasticizers, colorants/pigments/dyes and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, antioxidants such as Irgafos 168™, Irganox 1010™, and Irganox 1076™, and nucleating agents such as Milliken HPN20E™, and hindered amine light stabilizers (HALS) such as those taught for instance in U.S. Pat. Nos. 5,004,770; 5,204,473; 5,096,950; 5,300,544; 5,112,890; 5,124,378; 5,145,893; 5,216,156; 5,844,026; 5,980,783; 6,046,304; 6,117,995; 6,271,377; 6,297,299; 6,392,041; 6,376,584 and 6,472,456. The contents of these U.S. patents are incorporated by reference. These additives may be included in amounts effective to impart the desired properties.

An overview of the additives that can be used in the injection- or compression-moulded articles of the present invention may be found in Plastics Additives Handbook, ed. H. Zweifel, 5th edition, 2001, Hanser Publishers.

The blending of the components can be carried out according to any physical blending method and combinations thereof known in the art. This can be, for instance, dry blending, wet blending or melt blending. The blending conditions depend upon the blending technique and polyethylene involved.

If dry blending is employed, the dry blending conditions may include temperatures from room temperature up to just under the melting temperature of the polymer. The components can be dry blended prior to a melt blending stage, which can take place for example in an extruder.

Melt processing is fast and simple and makes use of standard equipment of the thermoplastics industry. The components can be melt blended in a batch process such as in a Banbury, Haake or Brabender Internal Mixer or in a continuous process, such as in an extruder e.g. a single or twin screw extruder, such as a ZKS twin screw extruder. During melt blending, the temperature at which the polymers are combined in the blender will generally be in the range between the highest melting point of the polymers employed and up to about 80° C. above such melting point, preferably between such melting point and up to 30° C. above it. The time required for the melt blending can vary broadly and depends on the method of blending employed. The time required is the time sufficient to thoroughly mix the components.

The caps and closures of the present invention can be prepared by injection moulding or compression moulding the resin composition as already defined herein-above. Preferably, the caps and closures are prepared by injection moulding. Any injection machine known in the art may be used in the present invention, such as for example ENGEL 125T or NETSTAL Synergy 1000 injection moulding machine.

All mould types may be used. The caps and closures of the present invention are particularly suitable for closing bottles, in particular bottles for carbonated or still drinks. Advantageously, the resin used in the invention is particularly suitable for single-piece caps and closures, including screw caps.

The injection moulding cycle may be split into three stages: filling, packing-holding, and cooling. During filling, polymer melt is forced into an empty cold cavity; once the cavity is filled; extra material is packed inside the cavity and held under high pressure in order to compensate for density increase during cooling. The cooling stage starts when the cavity gate is sealed by polymer solidification; further temperature decreases and polymer crystallization takes place during the cooling stage. Typical temperatures for the filling step are from 160° C. to 280° C., preferably from 180° C. to 260° C., preferably from 200° C. to 230° C. Injection-moulding as used herein is performed using methods and equipment well known to the person skilled in the art. An overview of injection moulding and compression moulding is for example given in Injection Moulding Handbook, D. V. Rosato et al., 3rd edition, 2000, Kluwer Academic Publishers.

The moulds used in the production of the present caps and closures may be any mould usually used in the production of caps and closures, such as for example multi-cavity moulds wherein a number of caps and closures is produced simultaneously.

The caps and closures of the present application are not especially limited. They may include screw-caps, caps and closures with a living hinge, glossy caps and closures, transparent caps and closures.

The caps and closures of the present application may be used in various packaging applications, such as for example food packaging, detergent packaging, cosmetic packaging, paint packaging or medical packaging. Examples in food packaging are caps and closures on tubes, bottles, such as for juices, water or milk products. Examples in detergent packaging are caps and closures for washing powders, dish soap, household cleaners. Examples in cosmetic packaging are shower gels, shampoos, oils, creams, liquid soaps. Examples in medical packaging are packaging for pills, solutions, disinfectants.

Hence, the present encompasses a packaging comprising the above defined caps and closures. In addition, the advantageous organoleptic properties and low volatile organic compounds content allow the caps and closures to be used in food application, in particular for closing bottles, such as bottles for carbonated and still drinks.

The invention will now be illustrated by the following, non-limiting illustrations of particular embodiments of the invention.

EXAMPLES

The density was measured according to the method of standard ISO 1183-2 at a temperature of 23° C.

The melt index MI2 was measured according to the method of standard ISO 1133:1997, condition D, at 190° C. and under a load of 2.16 kg.

The molecular weight distribution (MWD) is the ratio of the weight average molecular weight Mw to the number average molecular weight Mn i.e. Mw/Mn. The molecular weight ($M_n$ (number average molecular weight), $M_w$ (weight average molecular weight) and molecular weight distributions d (Mw/Mn) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}$ $(M_{PE})=0.965909\times\log_{10}(M_{PS})-0.28264)$ (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Macmesin Orbis Closure Torque Tester at 21° C., was used to evaluate application and removal torque and angle measurements. Torque-testing sample preparation: the thread start on the closures was manually marked. The preform thread start was indicated by a cutout on the preform which was then manually marked for additional visibility. The repeatability of the manually applied closure and preform thread alignment was approximately +/−5 degrees.

The closures were applied on a PET bottle neck at a constant torque (20 inch pounds), the closures terminated at an application angle (measured in degree) that is function of the slip agent performance. The higher the rotating angle, the better the slip performances are.

Example 1

In this example, the following components were used:

PE1 is a commercially available bimodal high density polyethylene used for caps and closures produced with a metallocene catalyst in two sequentially connected slurry loop reactors characterized by a density of 0.952 g/cm$^3$, a melt index of 2.0 g/10 min and a MWD of 4.5.

Erucamide: Incroslip C is used as erucamide (CAS No. 112-84-5), distributed by Croda Chemical.

Behenamide: Crodamide BR is used as Behenamide (CAS No. 3061-75-4), distributed by Croda Chemical.

Pentaerythritol tetrakis[3-(3',5'-di-tert-butyl-4'-hydroxyphenyl)propionate] commercially available as Irganox® 1010 by BASF.

Tris(2,4-ditert-butylphenyl) phosphite commercially available as Irgafos® 168 by BASF.

Calcium stearate commercially available from Baerlocher.

2-(2'-Hydroxy-3'-t-butyl-5'-methylphenyl)-5-chlorobenzotriazole (CAS No. 3896-11-05) commercially available as "Songsorb® 3260" by Songwon.

The resin compositions are shown in Table 1.

TABLE 1

|  | Resin 1 | Resin 2 |
| --- | --- | --- |
| PE1 | 100% by weight | 100% by weight |
| Irganox ® 1010 | 200 ppm | 200 ppm |
| Irgafos ® 168 | 1000 ppm | 1000 ppm |
| Calcium stearate | 1500 ppm | 1500 ppm |
| Erucamide | 2000 ppm | 1100 ppm |
| Behenamide |  | 1100 ppm |
| Songsorb ® 3260 | 1000 ppm | 1000 ppm |

Resins 1 and 2 were each individually compounded into twin-screw extruder ZSK58 and pellets were obtained.

Each resin was separately injection-moulded on a NESTAL injection machine equipped with a 48-cavities mould. The cap (2.4 g) design was appropriate for carbonated soft drinks and fitted on a 29-25 mm neck.

As a reference composition 1, caps were similarly produced using resin Eltex® B4020N1343 from Ineos polyolefins.

Eltex® B4020N1343 is a resin composition used for caps and closures comprising monomodal high density polyethylene produced with a Ziegler-Natta catalyst characterized by a density of 0.952 g/cm$^3$ (ISO 1183-2) and a melt index of 2.2 g/10 min (2.16 kg load ISO 1133), and 2300 ppm of behenamide and 400 to 500 ppm of Tinuvin® 326 (2-(2'-hydroxy-3'-t-butyl-5'-methylphenyl)-5-chlorobenzotriazole (CAS No. 3896-11-05) distributed by BASF.

The caps were then applied on bottles and the application angle was measured. The application angle and removal torque results are shown in Table 2.

TABLE 2

| Caps | Angle (°) | | Couple T0 (inch pounds) | |
| --- | --- | --- | --- | --- |
|  | average | standard deviation | Average | standard deviation |
| Resin 1 | 660 | 5.64 | 11.3 | 0.63 |
| Resin 2 | 649 | 2.89 | 13.7 | 0.62 |
| reference composition 1 | 632 | 9.88 | 16.6 | 1.61 |

The results in Table 2 show that the caps according to the present invention can be easily removed from a bottle compared to caps made of the reference resin. Compared to the reference caps, caps made of resins 1 and 2, allowed to reach higher capping angle (17 to 28° higher=higher slip) for lower removal torques (11.5-13.5 vs. 16.5 inch pounds). A better homogeneity for the angles and torque results was also obtained (lower standard deviation vs. reference example).

The caps were also analyzed according to the method EPA 524.2 to compare the volatiles:

All three sets of caps (10×3) were aged in a Xenon Lamp Aging Testing Chamber Q-SUN XE-1 SC. Irradiation in the chamber was fixed to 0.35 W/m$^2$ at 340 nm. A cooling system maintained the temperature to 40° C. After 4 h of aging, each cap was put in contact with 1 liter of water for 10 days at 40° C.

VOC (volatile organic compounds) was measured according to Environmental Protection Agency (EPA) method no.

524.2 using Purge-and-trap gas chromatography/mass spectrometry (P&T-GC/MS). The method involves extracting (purging) volatile organic compounds and surrogates with low water solubility from a sample matrix by bubbling an inert gas through the aqueous sample. Purged sample components are trapped in a tube containing suitable sorbent materials. When purging is complete, the sorbent tube is heated and back flushed with helium to desorb the trapped sample components into a capillary gas chromatography (GC) column interfaced with a mass spectrometer (MS). The column in temperature programmed to facilitate the separation of the method analytes which are then detected with the MS. Compounds elution from the GC column are identified by comparing their measured mass spectra and retention times to reference spectra and retention times in a data base. Reference spectra and retention times for analytes are obtained by the measurement of calibration standards under the same conditions used for samples. Analytes are quantitated using procedural standard calibration. The concentration of each identified component is measured by relating the MS response of the quantitation ion produced by that compound to the MS response of the quantitation ion produced by that compound to the MS response of the quantitation ion produced by a compound that is used as an internal standard. Surrogate analytes, whose concentrations are known in every sample, are measured with the same internal standard calibration procedure. Samples were analyzed using a system comprising of a Tekmar LSC 2000 purge-and-trap sampler and a gas chromatograph-quadrupole mass spectrometer, Fisons MD-800 GC-MS. The results are shown in Table 3.

TABLE 3

GC/MS Analysis based on EPA method 524.2

| | Caps resin 1 | Caps Resin 2 | Caps reference |
|---|---|---|---|
| Sample type: | Caps | Caps | Caps |
| | | Maceration: | |
| | 1 cap/liter | 1 cap/liter | 1 cap/liter |
| | | Temperature: | |
| | 40° C. | 40° C. | 40° C. |
| | | Duration: | |
| | 10 days µg/l | 10 days µg/l | 10 days µg/l |
| 1. Propane, 2-methyl | <0.05 | <0.05 | <0.05 |
| 2. n-Butane | <0.05 | <0.05 | <0.05 |
| 3. Silanol, trimethyl | <0.05 | <0.05 | <0.05 |
| 4. 1-Hexene | <0.05 | <0.05 | <0.05 |
| 5. Σ of Alkenes C6 (non 1-Hexene) | <0.05 | <0.05 | <0.05 |
| 6. Isobutanol | <1.0 | <1.0 | <1.0 |
| 7. Cyclopentane, methyl | <0.05 | <0.05 | <0.05 |
| 8. Cyclohexane | <0.05 | <0.05 | <0.05 |
| 9. n-Octane | <0.05 | <0.05 | <0.05 |
| 10. Propanal, 2,2-dimethyl | <0.05 | <0.05 | <0.05 |
| 11. 2-Butanone, 3,3-dimethyl | <0.05 | <0.05 | <0.05 |
| 12. Nonanal | <0.05 | <0.05 | <0.05 |
| 13. Butanal | <0.05 | <0.05 | <0.05 |
| 14. Hexanal | <0.05 | <0.05 | <0.05 |
| 15. Heptanal | <0.05 | <0.05 | <0.05 |
| 16. Octanal | <0.05 | <0.05 | <0.05 |

TABLE 3-continued

GC/MS Analysis based on EPA method 524.2

| | Caps resin 1 | Caps Resin 2 | Caps reference |
|---|---|---|---|
| Sample type: | Caps | Caps | Caps |
| | | Maceration: | |
| | 1 cap/liter | 1 cap/liter | 1 cap/liter |
| | | Temperature: | |
| | 40° C. | 40° C. | 40° C. |
| | | Duration: | |
| | 10 days µg/l | 10 days µg/l | 10 days µg/l |
| 17. 2-Nonenal | <0.05 | <0.05 | <0.05 |
| 18. 2-Decenal | <0.05 | <0.05 | <0.05 |
| 19. 2-Undecenal | <0.05 | <0.05 | <0.05 |
| 20. 1-Hexanol, 2-ethyl | <0.10 | <0.10 | <0.10 |

Instrument: P&T Tekmar LSC 2000 - GC/MS Fisons MD-800

Example 2

In this example, the following components were used:

PE1 is a commercially available bimodal high density polyethylene used for caps and closures produced with a metallocene catalyst in two sequentially connected slurry loop reactors characterized by a density of 0.952 g/cm$^3$, a melt index of 2 g/10 min and a MWD of 4.5.

Erucamide: Incroslip C is used as erucamide (CAS No. 112-84-5), distributed by Croda Chemical.

Behenamide: Crodamide BR is used as Behenamide (CAS No. 3061-75-4), distributed by Croda Chemical.

Pentaerythritol tetrakis[3-(3',5'-di-tert-butyl-4'-hydroxyphenyl)propionate] commercially available as Irganox® 1010 by BASF.

Tris(2,4-ditert-butylphenyl) phosphite commercially available as Irgafos® 168 by BASF.

Calcium stearate commercially available from Baerlocher.

2-(2'-Hydroxy-3'-t-butyl-5'-methylphenyl)-5-chlorobenzotriazole (CAS No. 3896-11-05) commercially available as "Songsorb® 3260" by Songwon.

TINUVIN 622 Butanedioic acid, dimethylester, polymer with 4-hydroxy-2,2,6,6-tetramethyl-1-piperidine ethanol (CAS Number 65447-77-0) Molecular weight Mn=3100-4000

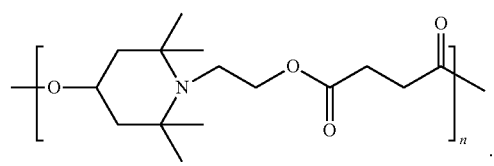

The resin compositions are show in Table 4.

TABLE 4

|  | Resin 1 | Resin 2 | Reference Resin 3 | Reference Resin 4 |
| --- | --- | --- | --- | --- |
| PE1 | 100% by weight | 100% by weight | 100% by weight | 100% by weight |
| Irganox ® 1010 | 200 ppm | 200 ppm | 200 ppm | 200 ppm |
| Irgafos ® 168 | 1000 ppm | 1000 ppm | 1000 ppm | 1000 ppm |
| Calcium stearate | 1500 ppm | 1500 ppm | 1500 ppm | 1500 ppm |
| Erucamide | 2000 ppm | 1100 ppm |  | 2000 ppm |
| Behenamide |  | 1100 ppm | 2200 |  |
| Songsorb ® 3260 | 1000 ppm | 1000 ppm |  |  |
| Tinuvin 622 |  |  | 1000 ppm | 1000 ppm |

Resins were each individually compounded into twin-screw extruder ZSK58 and pellets were obtained.

Each resin was injected for the production of natural caps on a Netstal Synergy 1000 equipped with a 4 cavity-mold (standard cap—PCO 1810). The reference resins 3 and 4 were also injected for comparison. The natural caps (2.6 g) were analyzed according to Environmental Protection Agency (EPA) method no. 524.2 (VOC in water), as described in Example 1.

The results are shown in Table 5

TABLE 5

|  | Resin 1 | Resin 2 | Reference Resin 3 | Reference Resin 4 |
| --- | --- | --- | --- | --- |
| Propanal, 2,2-dimethyl (µg/l) | 0.15 | 0.17 | 0.28 | 0.22 |
| 2-Butanone, 3,3-dimethyl (µg/l) | 0.14 | 0.23 | 0.27 | 0.15 |
| Nonanal (µg/l) | 0.23 | 0.22 | <0.10 | 0.63 |
| Butanal (µg/l) | <0.10 | <0.10 | 0.39 | <0.10 |
| Hexanal (µg/l) | <0.10 | <0.10 | <0.10 | 0.35 |
| Heptanal (µg/l) | <0.10 | <0.10 | <0.10 | 0.29 |
| Octanal (µg/l) | <0.10 | <0.10 | <0.10 | 0.18 |
| 1-Hexanol, 2-ethyl (µg/l) | <0.10 | <0.10 | 1.1 | 0.47 |
| total VOC (µg/l) | 0.52 | 0.62 | 2.04 | 2.29 |

Instrument: P&T Tekmar LSC 2000 - GC/MS Fisons MD-800

The caps according to the invention showed a lower total VOC content compared to caps made from reference resins 3 and 4. A much lower content of aldehydes molecules was observed with caps made of resins 1 and 2 compared to reference resin 4 showing a better stability for the new caps (less hexanal, heptanal, octanal & nonanal). Compared to reference caps 3, the new caps showed less butanal, propanal 2,2 dimethyl and 2-butanone 3,3 dimethyl.

The invention claimed is:

1. A cap or closure made from a resin composition comprising:
   at least one polyethylene having a density of at least 0.940 g/cm$^3$ when measured following the ISO 1183-2 method at 23° C.;
   at least 2000 ppm based on the total weight of the resin composition of erucamide;
   at least 1000 ppm based on the total weight of the resin composition comprising 2-(2'-hydroxy-3'-t-butyl-5'-methylphenyl)-5-chlorobenzotriazol;
   wherein the at least one polyethylene is formed using at least one metallocene catalyst; and
   optionally, wherein the resin composition further comprises at least 1000 ppm behenamide.

2. The cap or closure according to claim 1, wherein the at least one polyethylene has a melt index Ml$_2$ of from 0.5 g/10 min to 50 g/10 min when measured following the ISO 1133 method at 190° C. under a load of 2.16 kg.

3. The cap or closure according to claim 1, wherein the at least one polyethylene has a density of at least 0.940 g/cm$^3$ and of at most 0.975 g/cm$^3$.

4. The cap or closure according to claim 1, wherein the at least one polyethylene has a molecular weight distribution (MWD), which is the ratio of the weight average molecular weight Mw to the number average molecular weight Mn, of at least 3.5.

5. The cap or closure according to claim 1, wherein the resin composition comprises at least 80% by weight of the at least one polyethylene, based on the total weight of said resin composition.

6. The cap or closure according to claim 1 comprising a screw cap.

7. A process for the production of a cap or closure, the process comprising:
   (a) blending at least one polyethylene having a density of at least 0.940 g/cm?' when measured following the ISO 1183-2 method at 23° C.; with at least 2000 ppm based on the total weight of the blend of erucamide; and with at least 1000 ppm based on the total weight of the blend of 2 (2'-hydroxy-3'-t-butyl-5'-methylphenyl)-5-chlorobenzotriazole,
   (b) extruding the blend,
   (c) injection moulding or compression moulding the extruded blend into a cap or closure;
   wherein the at least one polyethylene is formed using at least one metallocene catalyst.

8. The process according to claim 7, wherein behenamide is also present in the blending step.

9. The composition of claim 1, comprising at least 1000 ppm behenamide.

* * * * *